Patented Apr. 29, 1941

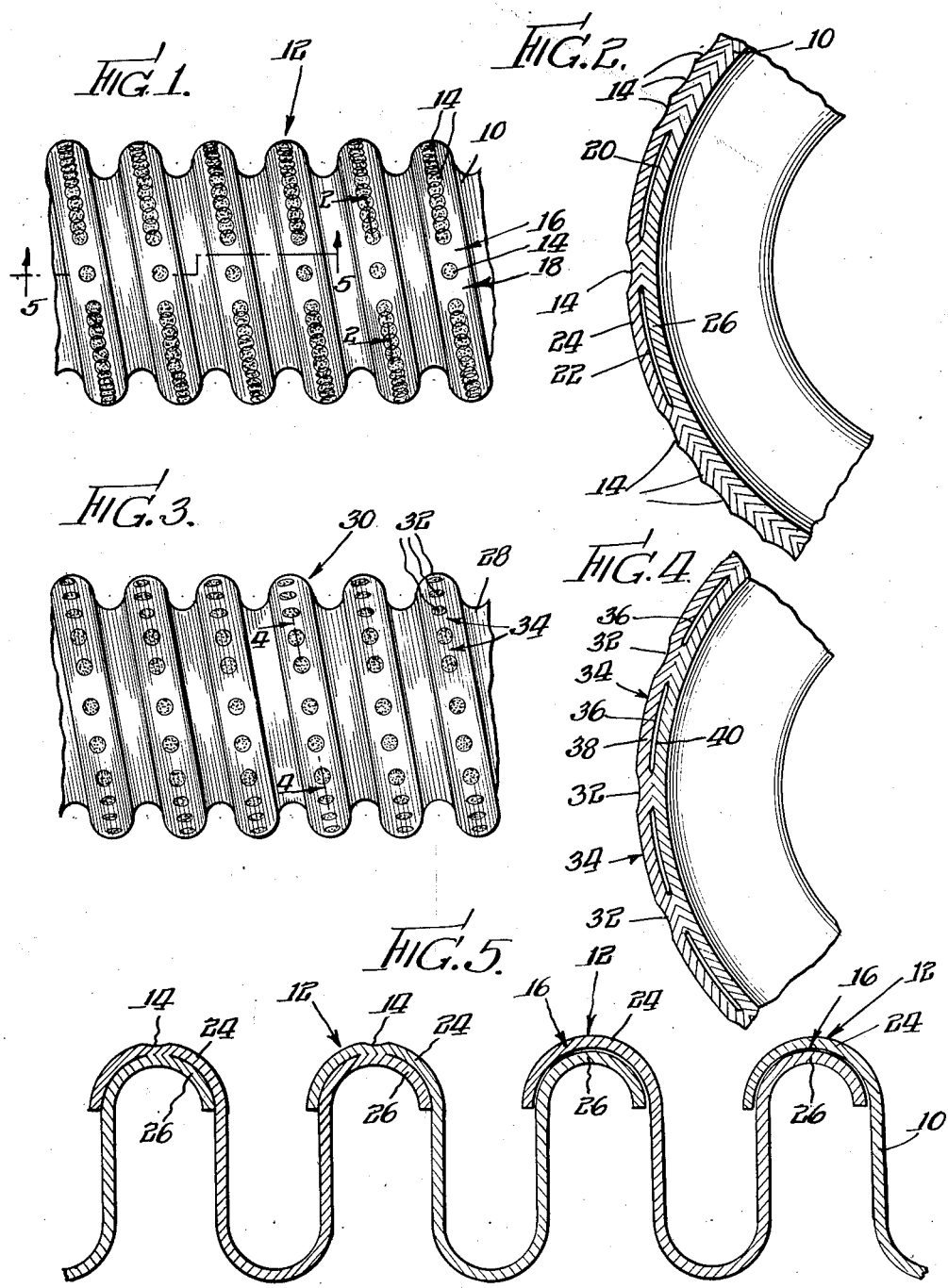

2,240,210

UNITED STATES PATENT OFFICE 2,240,210

METAL TUBING

Albert Dreyer, Lucerne, Switzerland

Application September 23, 1940, Serial No. 358,033
In Switzerland September 12, 1939

5 Claims. (Cl. 299—104)

This invention relates to flexible metal tubing. More particularly it relates to spirally wound flexible metal tubing.

In the making of flexible metal tubing by spirally winding profiled metal strip and electrically welding the spirally wound strip at its lapped edges, care is exercised to provide a tight, continuous weld so that the metal tubing may serve as a leak-proof conduit for fluids and gases. Apparatus for welding tubing in this manner is for example, disclosed in applicant's co-pending application, Serial No. 292,124, filed August 26, 1939.

It is on the other hand for certain uses desirable to provide flexible metal tubing which possesses certain leakage characteristics. Such metal hoses find use, for instance, in connection with apparatus for smoke screens, evaporators, and sprayers. Furthermore, they find utility within the chemical industry whenever, for example, gaseous or fluid mixtures are to be mixed in finest spray form with other media or are to be extracted from such media.

Still another use for such tubing is for the uniform heating of fluids, for example, for distributing steam in minute form for the pasteurization of wine, et cetera, for oxygen baths, for airing of aquaria, for adhesion through suction of paper in printing or other industries where such operations are carried out, for gas burners where fine seepage is required, and for a multitude of other related uses which will be apparent to those skilled in the art.

Wound metal hose without packing and which is not welded possesses a certain leakage characteristic, but is not satisfactory in many uses. For example, it is not suited where uniform seepage over the entire length of the tubing is desired since it is practically impossible to manufacture such hose so that it will have such seepage characteristics. Additionally, whatever may be achieved in manufacture, the slightest twist will cause such hose to change its wound position with the consequence that the character of the leakage will change considerably and not uniformly. Any slight change in pressure applied during the manufacture of the hose or any change in the temper or elasticity within the metal strip used in the manufacture of the hose will cause a change in the degree of tightness of the hose and thus produce uneven leakage characteristics. For the foregoing reasons, it is impossible to manufacture such special hoses to have in every case the same standard of tightness even if a desirable standard has been discovered.

A further undesirable feature of such metal hose wound without packing or welding is that in conducting compressed air, such air escapes in great volume from the beginning of the hose, while at the end substantially no air escapes due to the practically complete dissipation of air pressure adjacent the inlet. In many uses it is desirable to dissipate compressed air uniformly along the entire length of the hose and it will be apparent that hose manufactured as described above would not be suitable for this purpose.

It is therefore an object of this invention to provide metal hose by spirally winding a profiled metal strip, which metal hose has substantially uniform leakage characteristics throughout its entire length.

Another object is to provide a method for manufacturing such hose which method may be standardized to produce such metal hose in quantity with uniform leakage characteristics.

A more specific object is to provide a method which will produce successive lengths of such spirally wound metal tubing from profiled strips, the first and last of which successive lengths will have the same uniform leakage characteristics throughout their entire length.

Another object is to provide flexible metal tubing and a method for manufacturing the same which is capable of standardization, which metal tubing has uniform leakage characteristics not only throughout its length, but around its circumference as well.

Another object is to provide a method of manufacturing metal hose by spirally winding profiled metal strip, which method may be standardized and at the same time permits of variation so as to produce readily metal hose of any desired leakage characteristics.

A further object is to provide a method of controlling leakage characteristics of metal tubing spirally wound from profiled metal strip.

Other objects will be apparent hereinafter.

It has now been found that these objects may be accomplished by a method in which metal hose is spirally wound from profiled metal strips, but instead of being provided with a continuous weld along the lapped edges, the welding is interrupted or spaced so that a continuous weld along the overlapped edges is not provided. The open spaces through the weld then permit the desired seepage to take place. It will be apparent that this process can readily be standardized so that a succession of lengths of flexible metal tubing can be produced, of which the first and the last will have the same uniform standard seepage characteristics. For example, such hose may be produced according to the method and with the apparatus disclosed in the above-identified co-pending application wherein the spirally wound strips are welded together at their overlapping edges by a chain of overlapping weld spots simply by interrupting the welding as by interrupting the welding current so that spaces which are not welded are left.

It will be apparent that the invention is capable of numerous modifications, some of which are illustrated in the accompanying drawing from a consideration of which the nature of the invention will be more readily understood.

In the drawing

Figure 1 is a side elevation of a section of flexible metal tubing made in accordance with this invention.

Figure 2 is an enlarged section on the line 2—2 of Figure 1.

Figure 3 is a side elevation of another form of flexible metal tubing made in accordance with this invention.

Figure 4 is a section along the line 4—4 of Figure 3.

Figure 5 is a section on the line 5—5 of Figure 1.

Referring now particularly to Figures 1, 2 and 5, it is seen that the tubing is formed from a profiled metal strip 10 spirally wound so that successive adjacent edges overlap as at 12. These overlapped edges are secured together by a succession of welding spots 14. The particular section of tubing shown in Figures 1, 2 and 5 is designed to have a succession of points of leakage lying along a line lying lengthwise of the tubing and parallel to the axis thereof. This is accomplished by interrupting the welding as at 16 and 18, whereby openings 20 and 22 are left between the overlapped edges 24 and 26.

Numerous other modifications other than that shown in Figure 1 are clearly within the scope of the invention. Thus one of the interruptions 16 or 18 in the chain of weld spots 14 may be omitted or such interruptions may continue around the entire circumference of the tubing. Such a modification is shown in Figures 3 and 4, in which a profiled metal strip 28 is spirally wound so that the edges overlap as at 30, the overlapping edges being secured together by a chain of weld spots 32. These weld spots 32 do not overlap, but are uniformly spaced along the overlapping edges at intervals, leaving spaces 34 therebetween which are not welded. Openings 36 between the overlapped edges 38 and 40 are thus provided which are of uniform size and are uniformly spaced.

It is thought that the variety of other modifications of the invention which are possible will be apparent to those skilled in the art from the foregoing description. Thus it is possible according to the present invention to provide tubing of any desired leakage characteristics simply by interrupting the welding process according to a predetermined scheme. Thus for example, instead of interrupting the chain of overlapping welding spots on each complete convolution, it may be interrupted on every second or every fifth convolution. Moreover, the interruption may take place as many times as is desirable in a single convolution, provided always that sufficient weld spots are left to secure the adjacent overlapping edges together.

In the making of flexible metal tubing by welding together the overlapped edges of profiled spirally wound metal strips, for example, according to the method and apparatus described in applicant's above-identified co-pending application, the welding seam takes the form of a series of overlapping spots rather than that of a continuous band by reason of the fact that the welding current is a varied or alternating current. It will be clear of course that the welding spots represent the points where such fluctuating electric current is equal to or greater than that necessary to produce a weld, the intermediate spots corresponding to the intervals when it is below this strength. To produce flexible metal hose of the present invention by this process and apparatus, it is only necessary to interrupt the current by any desired means at such intervals and for such periods of time as to leave the desired open spaces. When such interruptions take place according to a predetermined plan or scheme, a flexible metal hose having uniform leakage characteristics as described above will be produced.

Although special reference is made to a particular method and apparatus for producing flexible metal tubing, it will be understood that any method involving the welding together of overlapping edges may be modified to provide the tubing disclosed herein. Thus whatever form the welded seam may take, and whether or not it be located on the ridge or in the trough of the various convolutions, the tubing described herein may be produced by interrupting the welding current according to a predetermined plan so as to provide a discontinuous welded seam and leave openings at uniform intervals throughout the length of the tubing.

The advantages and uses of flexible metal hose as described above having uniform leakage characteristics have been set forth to some extent hereinbefore. Many other advantages and uses will be apparent to those skilled in the art. For example, the flexibility of the hose coupled with the uniform leakage characteristics of the tubing gives it a very wide utility due to the fact that the tubing may be given any of a wide variety of forms according to the particular application to which it is put. In addition to the uses mentioned above, such tubing may be very advantageously substituted for the perforated piping used in water spray installations in the open or in greenhouses. Such perforated piping as is now used cannot be laid close to the ground because the perforations are so large that the spray would wash away the surrounding rich top soil. The flexible metal tubing described herein does not have this disadvantage, however, and could be laid either in or on the ground since the seepage can be made so minute that the water escapes only in drops and does not tend to wash away any dirt.

Metal tubing described above can be made from any desired kind of metal strip. Metals suitable for the manufacture of metal tubing are well known in the art and need not be detailed here. The tubing of the present invention may be produced from any such metals simply by varying the process of turning them into tubing in accordance with the description.

By way of illustrating a further advantage of the present invention, it is pointed out that one such metal suited for the manufacture of flexible metal tubing is stainless steel. Flexible metal tubing made from stainless steel is not only light in weight and relatively inexpensive, but possesses the further advantage when made in accordance with this invention that the fine openings in the tubing are not clogged by corrosion due to the fact that stainless steel is an acid and corrosion resistant material. This contrasts for example, with the fact that corrosion is often encountered if copper or iron pipe is used. A further advantage in the use of stainless steel is that a very thin strip can be used since the corrugations are a safeguard against kinking or damage through pressure or impact. The use of such very thin strips of course decreases the cost.

The term "profiled" metal strip as employed in the present specification and claims is intended to cover a strip which is formed or shaped in transverse section. In other words, the profiled strip possesses a cross section which is curved or otherwise shaped out of its normal flat section so as to render the final tubing somewhat flexible.

It is apparent that many widely different embodiments of this invention may be made without departing from the spirit and scope thereof and therefore the invention is not intended to be limited except as indicated in the appended claims.

The invention is hereby claimed as follows:

1. A flexible metal tubing for conducting fluids and the like comprising a spirally wound elongated profiled metal strip, the edges of the strip being brought into overlapped relation to form an overlapping spiral seam, and the overlapped edges being intermittently secured together along the length of said seam, the spaces between the secured sections being so proportioned with respect to the strip stock as to provide fluid leakage passages through the seam along the length of the tubing.

2. A flexible metal tubing for conducting fluids or the like comprising a spirally wound elongated profiled metal strip, the edges of the strip being brought into overlapped relation to form a profiled overlapping spiral seam, and the profiled overlapped strip edges being intermittently welded along the length of the seam, the spaces between the welded sections being so proportioned with respect to the strip stock and the profiling of the overlapping seam as to provide fluid leakage passages through the seam along the length of the tubing.

3. A flexible metal tubing for conducting fluids and the like comprising a spirally wound elongated profiled metal strip, the crest edges of the strip being in overlapped relation whereby to provide an overlapping spiral seam extending along the crest portions of the tubing, and the overlapped edges being intermittently welded together along the length of said seam, the spaces between the welded sections being so proportioned with respect to the strip stock as to provide fluid leakage passages through the seam along the length of the tubing.

4. A flexible metal tubing for conducting fluids and the like comprising a spirally wound elongated profiled metal strip, the crest edges of the strip being in overlapped relation whereby to provide an overlapping spiral seam extending along the crest portions of the tubing, and the overlapped edges being intermittently secured together along the length of said seam, the spaces between the secured sections being so proportioned with respect to the strip stock as to provide fluid leakage passages through the seam along the length of the tubing.

5. A flexible metal tubing for conducting fluids and the like comprising a spirally wound elongated profiled metal strip, the marginal edge portions of the strip being brought into juxtaposed relation to form a spiral seam, and the juxtaposed edges being intermittently secured together along the length of said seam, the spaces between the secured sections being so proportioned with respect to the strip stock as to provide fluid leakage passages through the seam along the length of the tubing.

ALBERT DREYER.

CERTIFICATE OF CORRECTION.

Patent No. 2,240,210.                                      April 29, 1941.

ALBERT DREYER.

It is hereby certified that error appears in the printed specification of the above numbered patent requiring correction as follows: Page 1, first column, line 2, for the word "wound" read --welded--; and that the said Letters Patent should be read with this correction therein that the same may conform to the record of the case in the Patent Office.

Signed and sealed this 22nd day of July, A. D. 1941.

(Seal)                                                        Henry Van Arsdale,
                                                             Acting Commissioner of Patents.